UNITED STATES PATENT OFFICE.

WALTER FORNET, OF HALENSEE-BERLIN, GERMANY.

PROCESS FOR THE PREPARATION OF A VACCINE.

1,122,379.     Specification of Letters Patent.     Patented Dec. 29, 1914.

No Drawing.     Application filed August 4, 1913. Serial No. 782,912.

*To all whom it may concern:*

Be it known that I, WALTER FORNET, a subject of the German Emperor, and resident of Küstrinerstrasse 3, Halensee-Berlin, Germany, have invented certain new and useful Improvements in Processes for the Preparation of a Vaccine, of which the following is a specification.

My invention relates to a process for the preparation of efficacious but innocuous vaccine from disease-germs, of which the following is a specification.

For the prevention and treatment of infectious diseases inoculations with specific germs of the particular disease have proved successful. The inoculation with ordinary virus often leads to loss of health by the vaccinated person, which must be attributed to non-specific nitrogen combinations contained in the vaccine side by side with the specific nitrogen compounds forming the protective and curative agents of the vaccine.

It is my object to avoid these undesirable results of vaccination by the elimination of the non-specific nitrogen compounds in the vaccine. According to my present invention I attain this object through cultivation of the bacteria in or upon a culture medium which shall contain only such nitrogen compounds as are dialyzable and through elimination of most of the remaining surplus of such nitrogen compounds after completed culture by a dialysis against a liquid similar to the culture medium but free from nitrogen. By this so-called differential dialysis injurious or detrimental effects from the vaccine are obviated, namely such as occur with the ordinary process for isolating the effective specific albumin of bacteria.

It is a well-known fact that a vaccine obtained from cultured bacteria, for example typhoid-vaccine is being dialyzed in the ordinary way of dialyzing against a medium free from nitrogen but otherwise different for example distilled water or ordinary water, the efficacy of the vaccine is reduced. By dialyzing, however, according to this invention, the original specific efficacy is entirely retained; while being deprived of the inflammatory and fever-engendering secondary effects which result from any of the known typhoid vaccines. These secondary effects from ordinary typhoid vaccines have, notwithstanding all prophylactic and therapeutic considerations, rendered general application uncertain and very limited, see: "*Denkschrift über die Typhusbekämpfung im Südwesten Deutschlands*" in the issues of the Imperial Health Department, vol. 41, 1912, page 447.

As an example, the process can be carried out in the following manner: Typhoid bacilli or other germs for breeding purposes are placed in distilled water to which is added 0.8% sodium-chlorid, 0.01% calcium chlorid, 0.0075% chlorid of potassium, 0.01% carbonate of sodium and 2% peptone. When the growth is completed, the culture is dialyzed against the same liquid (but with the difference that this liquid contains no peptone) until the greater portion of the peptone from the cultivating liquid has passed over through the dialyzing membrane into the outer liquid. In a similar manner can be produced tuberculin poor in nitrogen, as well as other vaccines.

What I claim as my invention and desire to secure by Letters Patent is:—

The process of preparing a vaccine from pathogenic bacilli which consists in cultivating the bacilli in a liquid nutrient medium containing only dialyzable nitrogenous compounds and crystallizable salts and then subjecting the culture to dialysis against a liquid of approximately the same composition as the culture medium except that it does not contain dialyzable nitrogen compounds.

In testimony whereof I have hereunto signed my name this 22d day of July 1913, in the presence of two subscribing witnesses.

WALTER FORNET.

Witnesses:
     WOLDEMAR HAUPT,
     HENRY HASPER.